Sept. 29, 1936.   D. E. REPLOGLE   2,055,557
METHOD AND MEANS FOR TRANSMITTING VISUAL REPRESENTATIONS IN COLORS
Filed March 26, 1930
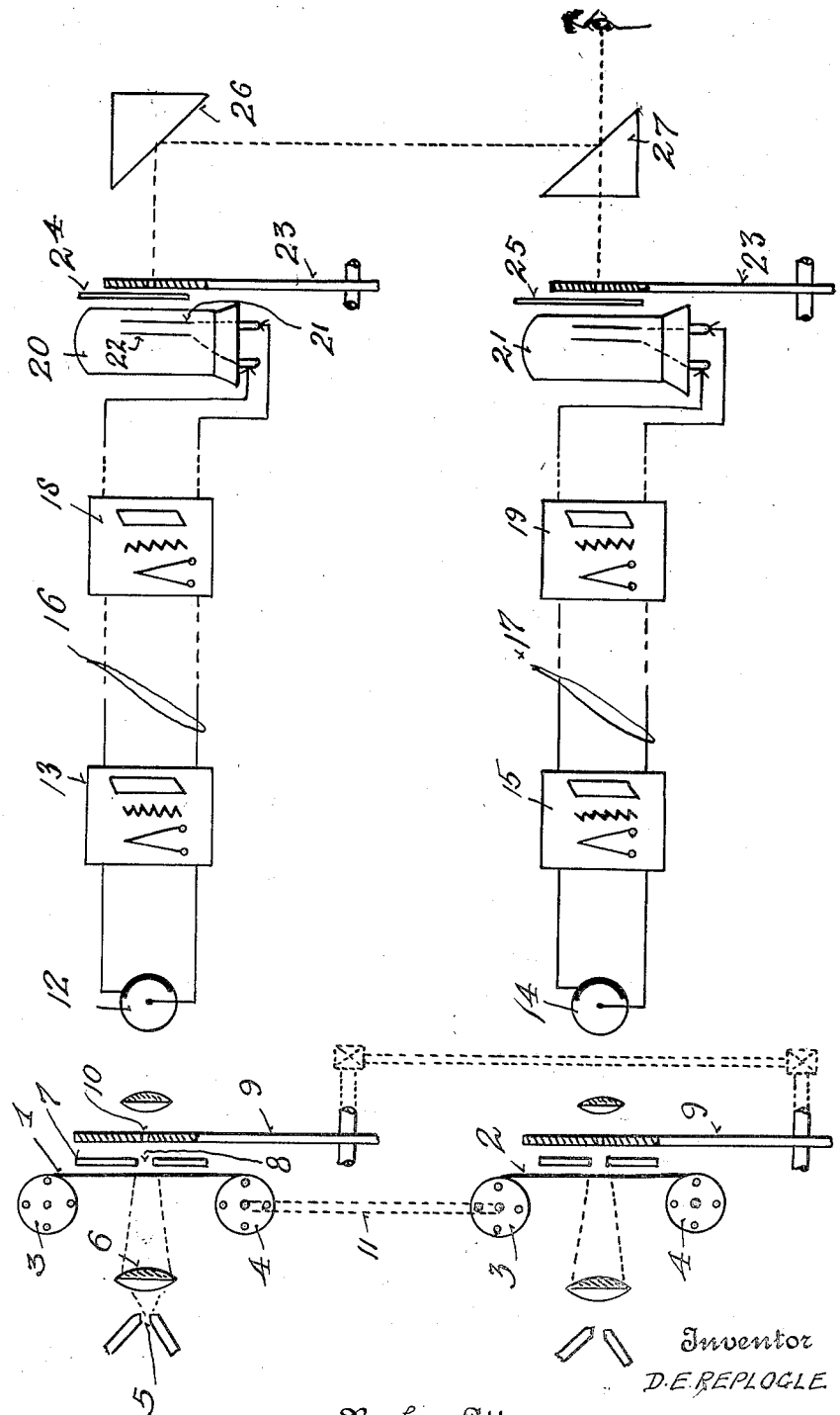
Inventor
D. E. REPLOGLE
By his Attorneys
Darby & Darby Patented Sept. 29, 1936

2,055,557

UNITED STATES PATENT OFFICE 2,055,557

METHOD AND MEANS FOR TRANSMITTING VISUAL REPRESENTATIONS IN COLORS

Delbert E. Replogle, Leonia, N. J., assignor, by mesne assignments, to Radio Corporation of America, New York, N. Y., a corporation of Delaware Application March 26, 1930, Serial No. 438,934

10 Claims. (Cl. 178—6)

This invention relates to electro-optical systems and with particularity to methods and means for transmitting and reproducing pictures, images or visual representations in colors.

The principal object of the invention is to provide a relatively simple and economical method of transmitting color representations or pictures to a distance.

A feature of the invention relates to the method of transmitting characteristics corresponding to one color of the visual representation over an associated channel and transmitting the characteristics of another color of the representation over a separate channel and simultaneously optically combining the effects of the currents in said channels to reproduce the reproduction in its original colors.

Other features and advantages of the invention not specifically enumerated will be apparent after a consideration of the following detail descriptions and the appended claims.

It has been recognized in the motion picture arts that color reproductions may be produced with substantial faithfulness as regards color values by employing a two color process. That is, in one known system of colored motion picture photography the pictures or representations are either successively or simultaneously photographed through two filters such as for example a green filter and a red filter and a single film having the composite color records thereon may be used for projection of the pictures or images in their original colorings.

It has been found that this two color process may be employed in television systems, and that images or visual representations may be transmitted to a distance with a fair degree of faithfulness in coloring, and at a minimum of time and expense.

In the drawing there is represented schematically one manner of employing the two-color process in a television reproducing system. In the drawing the numeral 1 represents a film, preferably of the motion picture type, said film being of the usual black and white type and representing one set of color values of the object or representation that is to be transmitted. For example, this film may be produced in the usual photographic manner by interposing a red light filter between the object or representation and the light sensitive film. Similarly the film 2 is of the black and white type but represents a different set of color values of the same object or visual representation to be transmitted; thus the film 2 may be produced by photographing the object or representation through a green filter. It will be understood of course that color values of the object or representation are recorded or photographed on the films 1 and 2, preferably although not necessarily, simultaneously. Furthermore the films 1 and 2 may be either negatives or positives as desired. Each of the films 1 and 2 is mounted in any suitable well known type of motion picture projecting mechanism, as represented diagrammatically by the numerals 3 and 4. Associated with each of the films is a high intensity light source such as an arc lamp 5 the light from which is projected by a suitable optical system 6 upon a portion of the associated film. Situated adjacent each of the films is a light baffle 7 having a light slit 8 therein. The light from source 5 which passes through the film and thence through the light slip 8 is adapted to be analyzed in successive elemental areas by an associated analyzing device 9. This analyzing device may be of any construction well known in the television art, such as the usual Nipkow disc. When a Nipkow disc is employed film 1 is advanced in the usual step-by-step fashion. However, if the film 1 is advanced in a continuous manner, then the scanning elements or openings 10 in member 9 may be arranged in the form of a circle.

For further detail description of a scanning mechanism that may be conveniently employed for this purpose, reference may be had to application Serial No. 418,205 filed January 3, 1930. As represented schematically by the numeral 11 the separate film advancing means are preferably coupled together so that the films 1 and 2 are advanced in synchronism before associated scanning devices 9. While this coupling may be of the mechanical type it will be understood that the films may be electrically synchronized in any well known manner. Similarly it is preferable to couple the devices 9 together, so that they execute their scanning movements in synchronism. As the device 9 is rotated the associated light sensitive cell 12 is exposed to light beams having intensity variations corresponding to successive elemental areas of the film 1 and corresponding currents are impressed upon the amplifier 13. Similarly the light sensitive cell 14 produces currents corresponding to the shade characteristics of the elemental areas of the film 2, these currents being amplified by the associated amplifier 15. By any well known transmission method the amplified currents from devices 12 and 14 may be transmitted over respective channels 16 and 17. These channels may be of the radio type or of the wired type, as desired. At the receiving end of each of the channels the incoming currents are detected and/or amplified in the devices 18 and 19 and the amplified currents are impressed upon associated reproducing lamps 20 and 21. These lamps are preferably of the glow discharge or gaseous conduction type employing a luminescent plate electrode 21 and a cooperating electrode 22.

Mounted for rotation in front of the lamps 20 and 21 are associated scanning or synthesizing devices 23 which may take the form of spirally perforated discs or drums of the type disclosed in application Serial No. 404,902 filed November 5, 1929. Interposed between each of the devices 23 and the associated lamp is a light filter 24, 25. The filter 24 is designed to pass only red rays or rays in the red end of the spectrum whereas the filter 25 is designed to pass green rays. Thus the variations of current transmitted over the channels 16 and 17 are translated into correspondingly varying red and green light beams which are scanned by the device 23. If the device 23 were viewed directly then an image of the original representation would be produced having a substantially red coloration corresponding to the red rays of the original representation. Similarly if the device 23 is viewed directly the original representation is reproduced in green corresponding to the green rays of the original representation. In order to combine optically the instantaneous red and green images any suitable combining system may be employed. Thus as illustrated schematically in the drawing the red image reproduced by device 23 is reflected through a prism or mirror 26 onto a cooperating prism or mirror 27 through which the observer views the device 23 directly. Inasmuch as the devices 23 are rotated in synchronism with each other, and also in synchronism with the device 9 at the transmitting station, the observer in looking through the mirror 27 sees the combined red and green images which due to their varying intensities and optical combination give the impression of a single colored reproduction of the original object or representation.

While one specific arrangement and organization of elements has been described it will be understood that the invention is not limited thereto. Thus instead of producing colored records of the image or object and scanning these records, the image or object may be scanned directly by devices 9 through associated red and green filters. Similarly instead of employing a glow discharge lamp and a separate filter 24 at the receiving end any suitable type of lamp which emits red or green rays may be employed. Furthermore, instead of scanning the object or representation simultaneously for red and green colored values the object may be scanned alternately. Thus the scanning elements 10 in one device 9 may be staggered spacially with respect to the scanning elements in the other scanning device and a single light sensitive cell may be employed.

What is claimed is:

1. The method which comprises making a translucent record in black and white of the shade and one range of color values of elemental areas of an entire visual representation, making another translucent record in black and white of the shade and a different range of color values of said elemental areas of the same entire visual representation, translating said records into corresponding electric currents, transmitting said currents simultaneously to a receiving station, retranslating said currents at the receiving station into corresponding colored light beams, and electro-optically combining said light beams.

2. In a system for transmitting colored motion pictures to a distance, means for making a photographic record in black and white of one range of color values of the scene or representation to be transmitted, means for making another photographic record in black and white of a different range of color values of the scene or representation, means for scanning said records to produce separate series of current impulses, each corresponding to one of said records, means for simultaneously transmitting said currents, means controlled by said currents for producing corresponding colored light beams, means for separately scanning said beams, and optical means for combining the beams after they have been separately scanned for reproducing the scene or representation in its original colors.

3. In a system for transmitting colored motion pictures to a distance, means for making separate photographic records of the scene or representation to be transmitted, each record being in black and white and corresponding to a different range of color values of the scene or representation, a scanning device for each of said records, a transmission channel associated with each scanning device, a reproducing light beam associated with each channel, means for varying the intensity of each light beam in accordance with the operation of the associated scanner, an image integrating device associated with each of said light beams for scanning said beams separately, and optical means for combining the said beams after the separate scanning thereof to reproduce the colored motion pictures.

4. A system according to claim 3 in which said light beams are of different colors.

5. A system according to claim 3 in which one photographic record corresponds to the red colorations of the scene or representation and the other photographic record corresponds to the green colorations of the scene or representation.

6. In an electro-optical system the combination of a first photographic record in black and white of one range of color values of a scene or representation, a second photographic record in black and white of a different range of color values of the scene or representation, a television analyzer associated over each record, a light responsive device controlled by each of said analyzers, a reproducing lamp controlled by each of said light responsive devices, a field of view, means for simultaneously illuminating said field of view by light from each of said lamps, television integrating means associated with each of said lamps separately scanning the light from each of said lamps, and optical means for combining the light from said lamps after it is scanned to reproduce the scene or representation in its original colors.

7. An apparatus for producing image currents for controlling the production of images in color comprising light sensitive electric elements, a record representative of an object or view having unlike portions corresponding to different color characteristics of the same part of the object or view, means for successively scanning elemental areas of said record, and means for directing light simultaneously from said portions to different ones respectively of said light sensitive electric elements to produce separate image currents.

8. An apparatus for producing image currents for controlling the production of images in color comprising light sensitive electric elements, a record representative of an object or view having unlike portions corresponding to different color characteristics of the same part of the object or view, means for successively scanning elemental areas of said record, and means comprising lenticular elements for directing light simultaneously from said portions to different ones respectively of said light sensitive electric elements to produce separate image currents.

9. An apparatus for producing image currents for controlling the production of images in color comprising light sensitive electric elements, a record representative of an object or view having unlike portions corresponding to different color characteristics of the same part of the object or view, means for succcessively scanning elemental areas of said record, and means including light deflecting elements for directing light simultaneously passing through said portions respectively to certain of said light sensitive elements.

10. An apparatus for producing image currents for controlling the production of images in color comprising light sensitive electric elements, a record representative of an object or view having unlike portions corresponding to different color characteristics of the same part of the object or view, cyclically moving means remote from said record for successively scanning elemental areas of said record, and means for directing light simultaneously from said portions to different ones respectively of said light sensitive electric elements to produce separate image currents.

DELBERT E. REPLOGLE.